(12) United States Patent
Lee et al.

(10) Patent No.: US 8,130,859 B2
(45) Date of Patent: Mar. 6, 2012

(54) APPARATUS AND METHOD FOR DETECTING SIGNAL USING MULTIVARIATE POLYNOMIAL IN MULTIPLE INPUT MULTIPLE OUTPUT COMMUNICATION SYSTEM

(75) Inventors: Hak-Ju Lee, Incheon (KR); Sung-Ryul Yun, Suwon-si (KR); Jae-Yoel Kim, Suwon-si (KR); Eun-Taek Lim, Suwon-si (KR); Geun-Ho Lee, Suwon-si (KR); Soo-Yong Choi, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 866 days.

(21) Appl. No.: 12/168,660

(22) Filed: Jul. 7, 2008

(65) Prior Publication Data

US 2009/0010350 A1 Jan. 8, 2009

(30) Foreign Application Priority Data

Jul. 5, 2007 (KR) ........................ 10-2007-0067487

(51) Int. Cl.
*H04B 7/02* (2006.01)
(52) U.S. Cl. ........ 375/267; 375/229; 375/259; 375/260; 375/316; 370/203; 370/252; 370/335
(58) Field of Classification Search .................. 375/140, 375/203, 229, 260, 267, 347, 259, 219, 316, 375/346; 370/203, 335, 252
See application file for complete search history.

(56) References Cited

U.S. PATENT DOCUMENTS

| 7,327,795 | B2 * | 2/2008 | Oprea ........................... 375/260 |
| 7,406,120 | B1 * | 7/2008 | Schmidt et al. ............... 375/229 |
| 7,558,337 | B2 * | 7/2009 | Ma et al. ...................... 375/316 |
| 7,986,742 | B2 * | 7/2011 | Ketchum et al. .............. 375/267 |

OTHER PUBLICATIONS

Terng-Ren Hsu et al., Generalized MLP/BP-based MIMO DFEs for Overcoming ISI and ACI in Band-limited Channels, IEEE International Symposium on VLSI Design, Automation and Test, Apr. 2007.*
Terng-Ren Hsu et al., Generalized MLP/BP-based MIMO DFEs for Overcoming ISI and ACI in Band-limited Channels, International Symposium on VSLI Design, Automation and Test, Apr. 25-27, 2007, pp. 103-106.

* cited by examiner

*Primary Examiner* — Khanh C Tran
*Assistant Examiner* — Fitwi Hailegiorgis
(74) *Attorney, Agent, or Firm* — Jefferson IP Law, LLP (57) ABSTRACT

A signal detection apparatus and method in a Multiple Input Multiple Output (MIMO) wireless communication system are provided. The apparatus includes a receiver for receiving training symbol vectors and a data signal vector from a transmitting end through a plurality of receive (Rx) antennas and a detector for expanding the training symbol vectors into second- or higher-order polynomials, for generating a weighting parameter vector for multivariate polynomial expansion of the data signal vector by using the polynomials expanded from the training symbol vectors and thereafter for expanding the data signal vector into a second- or higher-order multivariate polynomial using the weighting parameter vector, and for detecting Transmit (Tx) values of the data signal vector from the multivariate polynomial. Therefore, signal detection performance in a Multiple Input Multiple Output (MIMO) wireless communication system resembles that of a nonlinear scheme while complexity resembles that of a linear scheme.

23 Claims, 4 Drawing Sheets

APPARATUS AND METHOD FOR DETECTING SIGNAL USING MULTIVARIATE POLYNOMIAL IN MULTIPLE INPUT MULTIPLE OUTPUT COMMUNICATION SYSTEM

PRIORITY

This application claims the benefit under 35 U.S.C. §119 (a) of a Korean patent application filed in the Korean Intellectual Property Office on Jul. 5, 2007 and assigned Serial No. 2007-67487, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are Samsung Electronics Co., Ltd and Industry-Academic Cooperation Foundation, Yonsei University.

BACKGROUND OF THE INVENTION

1. Field of the Invention

The present invention relates to a Multiple Input Multiple Output (MIMO) wireless communication system. More particularly, the present invention relates to an apparatus and method for detecting a signal in a MIMO wireless communication system.

2. Description of the Related Art

With the growing demand for high-speed, high-quality data transmission, a Multiple Input Multiple Output (MIMO) wireless communication system using a plurality of Transmit (Tx)/Receive (Rx) antennas has drawn attention as a technique capable of satisfying such a demand. In the MIMO technique, communication can be performed by using a plurality of streams through a plurality of antennas. Therefore, in comparison with the conventional technique using a single antenna, channel capacity can be significantly increased. For example, if a transmitting end and a receiving end use M Tx antennas and M Rx antennas, respectively, wherein a channel between the antennas is independent and a bandwidth and entire Tx power are fixed, then an average channel capacity is increased M times in comparison with the case of using the single antenna.

In a MIMO wireless communication system, signal detection schemes of the receiving end can be classified into linear schemes and non-linear schemes. Examples of linear schemes include a Zero Forcing (ZF) detection scheme and a Minimum Mean Squared Error (MMSE) detection scheme. Examples of non-linear schemes include a Vertical-Bell Laboratory Layered Space-Time (V-BLAST) detection scheme and a Maximum Likelihood (ML) detection scheme.

In the ZF detection scheme, a Tx signal is detected by multiplying an Rx signal vector and a detection matrix. When the ZF detection scheme is used, a noise amplification effect may occur. The MMSE detection scheme is used to solve the noise amplification effect. However, since the MMSE detection scheme is also a linear scheme, a performance limitation exists. The V-BLAST detection scheme outperforms the ZF detection scheme or the MMSE detection scheme in terms of detection performance. However, a recursive operation performed in the V-BLAST detection scheme results in a high complexity. Further, although the ML detection scheme shows an optimal detection performance, its implementation is difficult because its operational complexity exponentially increases in proportion to a constellation size.

As described above, various signal detection schemes proposed for a MIMO wireless communication system have trade-off relationships in terms of performance and complexity. Accordingly, in order for the MIMO wireless communication system to effectively detect a signal, there is a need for a signal detection scheme of which performance is close to that of the non-linear scheme and complexity is similar to that of the linear scheme.

SUMMARY OF THE INVENTION

An aspect of the present invention is to address at least the above-mentioned problems and/or disadvantages and to provide at least the advantages described below. Accordingly, an aspect of the present invention is to provide a signal detection apparatus and method having performance close to that of a non-linear scheme and complexity similar to that of a linear scheme in a Multiple Input Multiple Output (MIMO) wireless communication system.

Another aspect of the present invention is to provide a signal detection apparatus and method using a multivariate polynomial in a MIMO wireless communication system.

Still another aspect of the present invention is to provide a signal detection apparatus and method using a multivariate polynomial having a low complexity in a MIMO wireless communication system.

In accordance with an aspect of the present invention, a receiving-end apparatus in a MIMO wireless communication system is provided. The apparatus includes a receiver for receiving training symbol vectors and a data signal vector from a transmitting end through a plurality of receive (Rx) antennas and a detector for expanding the training symbol vectors into second-or higher-order polynomials, respectively, for generating a weighting parameter vector for multivariate polynomial expansion of the data signal vector using the polynomials expanded respectively from the training symbol vectors and thereafter for expanding the data signal vector into a second-or higher-order multivariate polynomial by using the weighting parameter vector, and for detecting Transmit (Tx) values of the data signal vector from the multivariate polynomial.

In accordance with another aspect of the present invention, a signal detection method of a receiving end in a MIMO wireless communication system is provided. The method includes expanding training symbol vectors received from a transmitting end into second-or higher-order polynomials, respectively, generating a weighting parameter vector for multivariate polynomial expansion of the data signal vector by using the polynomials expanded respectively from the training symbol vectors, expanding the data signal vector received from the transmitting end into a second-or higher-order multivariate polynomial by using the weighting parameter vector and detecting Tx values of the data signal vector from the multivariate polynomial.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention to be described hereinafter relate to a technique in which a signal is detected using a multivariate polynomial in a Multiple Input Multiple Output (MIMO) wireless communication system. In other words, the present invention provides a technique for applying a signal detection process of a MIMO wireless communication system to a multivariate polynomial expansion operation.

In general, a multivariate polynomial regression provides an effective method and solution for explaining a complex non-linear input-output relationship. Therefore, the multivariate polynomial regression is widely used for optimization, signal processing, pattern classification, etc. A typical polynomial regression model uses second-or higher-order terms. A typical polynomial regression model can be expressed by Equation (1) below.

$$g(\alpha, x) = \sum_{i}^{K} \alpha_i x_1^{n_1} x_2^{n_2} \ldots x_l^{n_l} \qquad \text{Equation (1)}$$
$$= \alpha_0 + \alpha_{11} x_1 + \alpha_{12} x_2 + \ldots + \alpha_{1l} x_l + \alpha_{21} x_1^2 +$$
$$\alpha_{22} x_2^2 + \ldots + \alpha_{2l} x_l^2 + \alpha_{2l+1} x_1 x_2 +$$
$$\alpha_{2l+2} x_1 x_3 + \ldots + \alpha_{r1} x_1^r + \alpha_{r2} x_2^r + \ldots +$$
$$\alpha_{rl} x_l^r + \alpha_{rl+1} x_1^{r-1} x_2^1 + \ldots$$

In Equation (1) above, $g(\alpha,x)$ denotes a multivariate polynomial, K denotes the number of terms, $\alpha$ denotes a weighting parameter vector for polynomial expansion, and x denotes a variable vector to be expanded. Herein, $g(\alpha,x)$ corresponds to a detected transmit (Tx) signal vector, and x corresponds to a receive (Rx) signal vector.

In Equation (1) above, all non-negative integers $n_1, n_2, \ldots, n_l$ are summed. In addition, $(n_1+n_2+\ldots n_l)$ is less than or equal to r which denotes an approximation order. By estimating the weighting parameter vector $\alpha$, $g(\alpha,x)$ can be finally obtained.

A second-order multivariate polynomial having two input variables and having an order of 2 (i.e., l=2 and r=2) can be expressed by Equation (2) below.

$$g(\alpha,x) = \alpha^T p(x) \qquad \text{Equation (2),}$$

$$\alpha = [\alpha_1, \alpha_2, \alpha_3, \alpha_4, \alpha_5, \alpha_6]^T$$

where $$p(x) = [1, x_1, x_2, x_1^2, x_1 x_2, x_2^2]^T$$

In Equation (2) above, $g(\alpha,x)$ denotes a multivariate polynomial, $\alpha$ denotes a weighting parameter vector for polynomial expansion, x denotes a variable vector to be expanded, and p(x) denotes a polynomial expanded from the variable vector x.

If m training symbol vectors are provided, where m is greater than the number of terms (i.e., K), then least-square error minimization can be obtained as expressed by Equation (3) below.

$$e(\alpha, x) = \sum_{i=1}^{m} [y_i - g(\alpha, x_i)]^2 = [y - P\alpha]^T [y - P\alpha] \qquad \text{Equation (3)}$$

In Equation (3) above, $e(\alpha,x)$ denotes a least-square error minimum value, $\alpha$ denotes a weighting parameter vector for polynomial expansion, x denotes a variable vector to be expanded, y denotes a target vector for approximation, m denotes the number of training symbol vectors, and P denotes an error coefficient matrix for the weighting parameter vector $\alpha$. Herein, $e(\alpha,x)$ corresponds to a least-square error minimum value between a detected Tx signal vector and an actual Tx signal vector, x corresponds to an Rx signal vector, and y corresponds to a Tx signal vector.

The weighting parameter vector $\alpha$ of Equation (3) above is obtained by Equation (4) below.

$$\alpha = \frac{P^T}{P^T P} y \qquad \text{Equation (4)}$$

In Equation (4) above, $\alpha$ denotes a weighting parameter vector for multivariate polynomial expansion, P denotes an error coefficient matrix for the weighting parameter vector $\alpha$, and y denotes a target vector for approximation. Herein, y corresponds to a Tx signal vector. Since the Tx signal vector is a training symbol vector in Equation (4) above, a receiving end can recognize the Tx signal vector.

The matrix P of Equation (4) above can be expressed by Equation (5) below.

$$P = \begin{bmatrix} 1 & x_{1,1} & x_{2,1} & x_{1,1}^2 & x_{1,1}x_{2,1} & x_{2,1}^2 \\ 1 & x_{1,2} & x_{2,2} & x_{1,2}^2 & x_{1,2}x_{2,2} & x_{2,2}^2 \\ \vdots & \vdots & \vdots & \vdots & \vdots & \vdots \\ 1 & x_{1,m} & x_{2,m} & x_{1,m}^2 & x_{1,m}x_{2,m} & x_{2,m}^2 \end{bmatrix} \quad \text{Equation (5)}$$

In Equation (5) above, P denotes an error coefficient matrix for the weighting parameter vector $\alpha$, and $x_{j,k}$ denotes a $k^{th}$ input provided to a $j^{th}$ input node. Herein, the $j^{th}$ input node corresponds to a $j^{th}$ Rx antenna, and the $k^{th}$ input corresponds to a training symbol vector of an index k.

In this case, if a linear dependence exists between elements of the matrix P, a multicollinearity problem occurs. In practice, the multicollinearity problem may occur in a receiving process of the MIMO system. To solve the multicollinearity problem, a weight decay regularization may be performed by using an error function of Equation (6) below.

$$e(\alpha, x) = \sum_{i=1}^{m} [y_i - g(\alpha, x_i)]^2 + b\|\alpha\|_2^2 \quad \text{Equation (6)}$$
$$= [y - P\alpha]^T [y - P\alpha] + b\alpha^T \alpha$$

In Equation (6) above, $e(\alpha,x)$ denotes a least-square error minimum value, $\alpha$ denotes a weighting parameter vector for polynomial expansion, x denotes a variable vector to be expanded, y denotes a target vector for approximation, m denotes the number of training symbol vectors, b denotes a regularization constant, $\|\bullet\|^2$ denotes a 2-norm operator, and P denotes an error coefficient matrix for the weighting parameter vector $\alpha$.

Through minimization of the error function of Equation (6) above, the weighting parameter vector $\alpha$ can be calculated according to Equation (7) below.

$$\alpha = \frac{P^T}{P^T P + bI} y \quad \text{Equation (7)}$$

In Equation (7) above, $\alpha$ denotes a weighting parameter vector for multivariate polynomial expansion, y denotes a target vector for approximation, b denotes a regularization constant, and P denotes an error coefficient matrix for the weighting parameter vector $\alpha$. Herein, the target vector y corresponds to a Tx signal vector. Since the Tx signal vector is a training symbol vector in Equation (7) above, the receiving end can recognize the Tx signal vector.

A special type of a multivariate polynomial called a multinomial can be expressed by Equation (8) below.

$$(x_1 + x_2 + \ldots + x_l)^r = \sum \frac{r!}{n_1! n_2! \ldots n_l!} x_1^{n_1} x_2^{n_2} \ldots x_l^{n_l} \quad \text{Equation (8)}$$

In Equation (8) above, $x_l$ denotes a variable to be polynomial-expanded, and r denotes an approximation order. A summation operation $\Sigma$ is performed on a combination of all integers $n_1, n_2, \ldots, n_l$ (except for negative integers), where $n_1+n_2+\ldots n_l=r$. Herein, the variable $x_l$ corresponds to an Rx signal received through an $l^{th}$ Rx antenna.

Assume that a total of K+1 terms exist in a multinomial model shown in Equation (8) above. As an application for using the multinomial model to identify Rx signals, a weighting parameter vector used in an expression such as Equation (9) below can be estimated.

$$\hat{f}_{MN}(\alpha) = \alpha_0 + \sum_j \alpha_j (x_1^{n_1} x_2^{n_2} \ldots x_l^{n_l}), \; j = 1,2, \ldots, K \quad \text{Equation (9)}$$

In Equation (9) above, $\hat{f}_{MN}(\alpha)$ denotes a multinomial when a weighting parameter vector is $\alpha$, $\alpha_j$ denotes a $j^{th}$ element of the weighting parameter vector, and $x_l$ denotes a variable to be polynomial-expanded. Herein, the multinomial $\hat{f}_{MN}(\alpha)$ corresponds to a detected Tx signal vector, and the variable $x_l$ corresponds to an Rx signal received through an $l^{th}$ Rx antenna.

As another application for using the multinomial model to identify Rx signals, all power levels are concurrently processed as expressed by Equation (10) below.

$$\hat{f}_{MN}(\alpha) = \alpha_0 + \sum_{j=1}^{r} \alpha_j (x_1 + x_2 + \ldots + x_l)^j, \quad \text{Equation (10)}$$
$$j = 1,2, \ldots, K$$

In Equation (10) above, $\hat{f}_{MN}(\alpha)$ denotes a multinomial when a weighting parameter vector is $\alpha$, $\alpha_j$ denotes a $j^{th}$ element of the weighting parameter vector, and $x_l$ denotes a variable to be polynomial-expanded. Herein, the multinomial $\hat{f}_{MN}(\alpha)$ corresponds to a detected Tx signal vector, and the variable $x_l$ corresponds to an Rx signal received through an $l^{th}$ Rx antenna.

Regarding the approximation capability of a polynomial, any continuous function defined within a certain period can be approximated as accurately as desired using a polynomial function. However, the number of terms to be approximated is sharply increased as the number of inputs and a polynomial order are increased. In case of the multinomial model of Equation (9) above, although the number of terms is significantly decreased, an approximation deficiency phenomenon may occur because only high-order terms are used. In case of the multinomial model of Equation (10) above, although the multinomial model depends on only an approximation order and the number of terms thereof is significantly decreased, the approximation deficiency phenomenon may also occur because approximation is collectively affected by inputs.

A model expressed by Equation (11) below is considered to reduce the number of terms of the multivariate polynomial.

$$\hat{f}_{MN} = \alpha_0 + \sum_{j=1}^{r} (\alpha_{j1} x_1 + \alpha_{j2} x_2 + \ldots + \alpha_{jl} x_l)^j \quad \text{Equation (11)}$$

In Equation (11) above, $\hat{f}_{MN}$ denotes a multinomial when a weighting parameter vector is $\alpha$, $\alpha_j$ denotes a $j^{th}$ element of the weighting parameter vector, and $x_l$ denotes a variable to be polynomial-expanded. Herein, the multinomial $\hat{f}_{MN}$ corresponds to a detected Tx signal vector, and the variable $x_l$ corresponds to an Rx signal received through an $l^{th}$ Rx antenna.

The model of Equation (11) above is a non-linear estimation model, and a weight parameter $\alpha_{jk}$ of Equation (11)

above is not easily obtained. Thus, there is a need to consider a model that is more linear than the model of Equation (11) above. Assume that two points α and $α_1$ exist in a differentiable multinomial function. Then, according to a mean value theorem, a multinomial function for the point $α_1$ can be expressed by Equation (12) below.

$$f(α) = (α_{j1}x_1 + α_{j2}x_2 + \ldots + α_{jl}x_l)^l \qquad \text{Equation (12)}$$
$$= f(α_1) + (α - α_1)^T \nabla f(\bar{α})$$

where $j = 2, \ldots, r$ and $\bar{α} = (1 - β)α_1 + βα, 0 \le β \le 1,$

In Equation (12) above, f(α) denotes a multinomial function, α denotes a weighting parameter vector, $α_1$ denotes an arbitrary point, and β denotes an arbitrary constant. Herein, $x_l$ corresponds to an Rx signal received through an $l^{th}$ Rx antenna.

In Equation (12) above, if terms are properly selected, coefficients within $f(α_1)$ and $\nabla f(\bar{α})$ are omitted, and a sum of weighted input terms is included, then a multivariate polynomial model is obtained as expressed by Equation (13) below.

$$\hat{f}_{RM'} = α_0 + \sum_{j=1}^{l} α_j x_j + \sum_{j=1}^{r} α_{l+j}(x_1 + x_2 + \ldots + x_l)^j + \qquad \text{Equation (13)}$$
$$\sum_{j=2}^{r} (α_j^T \cdot x)(x_1 + x_2 + \ldots + x_l)^{j-1}, l, r \ge 2$$

In Equation (13) above, $\hat{f}_{RM'}$ denotes a semi-reduced model of the multinomial, $α_j$ denotes a $j^{th}$ element of the weighting parameter vector, $x_l$ denotes a variable to be polynomial-expanded, l denotes the number of input values, and r denotes an approximation order.

If high-order terms of all elements are included in Equation (13) above, a Reduced Model (RM) of a multinomial can be obtained as expressed by Equation (14) below.

$$\hat{f}_{RM} = α_0 + \sum_{k=1}^{r}\sum_{j=1}^{l} α_{kj} x_j^k + \sum_{j=1}^{r} α_{rl+j}(x_1 + x_2 + \ldots + x_l)^j + \qquad \text{Equation (14)}$$
$$\sum_{j=2}^{r} (α_j^T \cdot x)(x_1 + x_2 + \ldots + x_l)^{j-1}, l, r \le 2$$

In Equation (14) above, $\hat{f}_{RM}$ denotes a reduced model of the multinomial, $α_j$ denotes a $j^{th}$ element of the weighting parameter vector, $x_l$ denotes a variable to be polynomial-expanded, l denotes the number of input values, and r denotes an approximation order. Herein, $\hat{f}_{RM}$ corresponds to a detected Tx signal vector, and the variable $x_l$ corresponds to an $\hat{f}_{RM}$ signal received through an $l^{th}$ Rx antenna.

Equation (14) above can be used for signal detection in a MIMO wireless communication system, as will be described below. In Equation (14) above, x corresponds to an Rx signal vector, and $\hat{f}_{RM}$ corresponds to a detected Tx signal vector. In an exemplary implementation, the receiving end calculates a weighting parameter vector α by substituting a plurality of received training symbols into Equation (4) or Equation (7) above, expands the Rx signal vector into a polynomial as expressed by Equation (14) above, and detects the Tx signal vector using the weighting parameter vector α and the Rx signal vector expanded to the polynomial. In this case, the receiving end must determine a polynomial order. In other words, the receiving end must determine up to which order the Rx signal vector will be expanded. The polynomial order may be determined by either the transmitting end or the receiving end. The higher the polynomial order, the better the detection performance. Thus, it is preferable to determine a high order when a channel condition is poor. In addition, the receiving end may cancel interference between elements included in the detected Tx signal vector.

Now, an exemplary structure and operation of a MIMO receiving end that detects a signal according to the aforementioned method will be described in detail with reference to the accompanying drawings.

Figure 1:
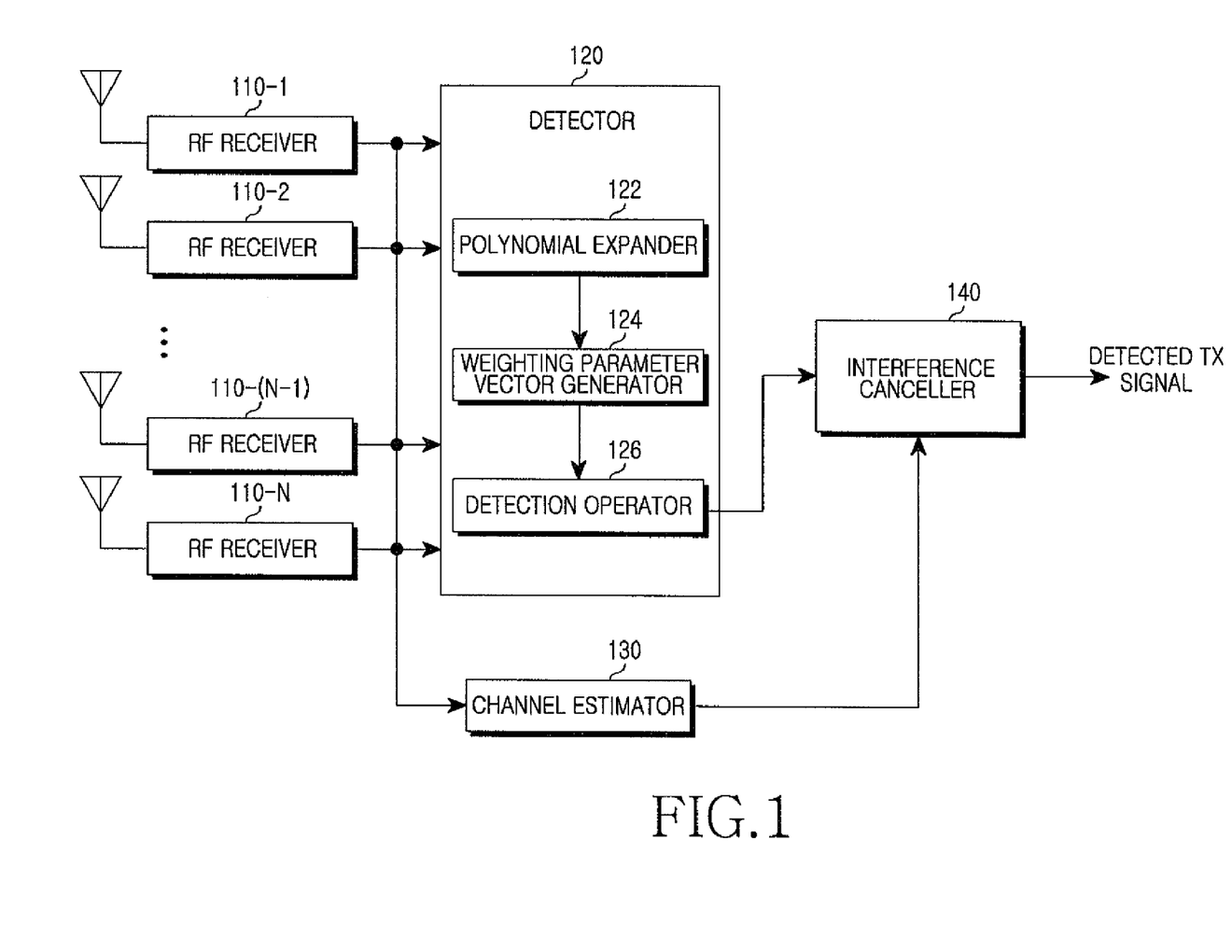
FIG. 1 is a block diagram of a receiving end in a Multiple Input Multiple Output (MIMO) wireless communication system according to an exemplary embodiment of the present invention.

FIG. 1 is a block diagram of a receiving end in a MIMO wireless communication system according to an exemplary embodiment of the present invention.

Referring to FIG. 1, the receiving end includes a plurality of Radio Frequency (RF) receivers 110-1 to 110-N, a signal detector 120, a channel estimator 130, and an interference canceller 140.

The plurality of RF receivers 110-1 to 110-N down-convert RF signals received through respective antennas into baseband signals. Further, the RF receivers 110-1 to 110-N provide the signal detector 120 with training symbols and data signals received through the antennas. The signal detector 120 detects Tx signals by using Rx signals provided from the RF receivers 110-1 to 110-N through the respective antennas. In particular, according to an exemplary embodiment of the present invention, the signal detector 120 detects Tx values of a data signal vector by expanding the data signal vector into a multivariate polynomial. The channel estimator 130 estimates a channel with respect to a transmitting end by using a preset Rx signal (e.g., a pilot signal). The interference canceller 140 cancels an interference component for each stream from the detected signal.

The signal detector 120 includes a polynomial expander 122, a weighting parameter vector generator 124, and a detection operator 126.

The polynomial expander 122 respectively expands the candidate symbol vectors provided from the plurality of RF receivers 110-1 to 110-N into polynomials. For example, if a polynomial order is 2 and one training symbol vector $[t_1\ t_2]$ is received through two Rx antennas, the polynomial expander 122 expands the vector $[t_1\ t_2]$ into $[1, t_1, t_2, t_1^2, t_1 t_2, t_2^2]$.

The weighting parameter vector generator 124 configures an error coefficient matrix P in which rows correspond to the expanded training symbol vectors provided from the polynomial expander 122. Further, the weighting parameter vector generator 124 generates a polynomial weighting parameter vector α by using the matrix P and Tx values of the training symbol vector. For example, the weighting parameter vector generator 124 calculates the matrix P as expressed by Equation (5) above, and generates the vector α by substituting the matrix P into Equation (4) or Equation (7) above.

The detection operator 126 detects the Tx values of the data signal vector from the vector α and the data signal vector. That is, the detection operator 126 expands the received data signal vector into a polynomial, respectively multiplies elements of the polynomial, which is expanded from the data signal vector, by corresponding elements of the vector α, and sums the multiplication results. As a result, the Tx values of the data signal vector are detected. For example, the detection operator 126 detects the Tx values of the data signal vector according to Equation (14) above.

The interference canceller 140 cancels interference between elements of the detected Tx signal vector in order to increase accuracy of the Tx signal vector detected by the detector 120. If two Rx antennas are used, two elements of a Tx signal vector can be expressed by Equation (15) below.

$$y_1 = h_{11}x_1 + h_{12}x_2$$

$$y_2 = h_{21}x_1 + h_{22}x_2 \qquad \text{Equation (15)}$$

In Equation (15) above, $y_i$ denotes an Rx signal received through an $i^{th}$ Rx antenna, $h_{jk}$ denotes a channel between a $j^{th}$ Tx antenna of the transmitting end and a $k^{th}$ Rx antenna of the receiving end, and $x_i$ denotes a Tx signal transmitted through an $i^{th}$ Tx antenna. A noise component is omitted in Equation (15) above.

Accordingly, if $x'_1$ and $x'_2$ denote signals detected by the detector 120, the signal $x'_1$ and the signal $x'_2$ both include an $x_1$-component and an $x_2$-component. That is, each of the signal $x'_1$ and the signal $x'_2$ includes its counterpart signal as interference. In this case, if it is determined that detection reliability for the signal $x'_1$ is higher than that of signal $x'_2$, the interference canceller 140 regards the signal $x'_1$ as the signal $x_1$ and thus removes the $x_1$-component from a signal $y_2$. That is, the interference canceller 140 cancels interference by subtracting $x'_1 h_{21}$ from the signal $y_2$. The detection reliability may be determined using received signal strength for each Tx antenna.

The receiving end performs signal detection using a multivariate polynomial according to the structure shown in FIG. 1 above. In this case, the receiving end must determine the polynomial order. In other words, the receiving end must determine the order to which the Rx signal vector will be expanded. The higher the polynomial order, the better the detection performance. Thus, it is preferable to determine a high order when a channel condition is poor. Therefore, the polynomial order may be determined by the transmitting end or the receiving end by considering the channel condition, an operational complexity and the like. Alternatively, the polynomial order may have a fixed value according to a system configuration.

If the polynomial order is determined by the transmitting end, although not shown, the receiving end further includes a control information evaluator. The control information evaluator evaluates information concerning the polynomial order that is forwarded from the transmitting end, and provides the information to both the polynomial expander 122 and the detection operator 126. On the other hand, if the polynomial order is determined by the receiving end, although not shown, the receiving end further includes an expansion-order determining unit. The expansion-order determining unit determines an order of a multivariate polynomial and provides the order to the polynomial expander 122 and the detection operator 126. Alternatively, if the polynomial order is fixed, the polynomial expander 122 and the detection operator 126 expand the multivariate polynomial according to a preset value.

Figure 2:
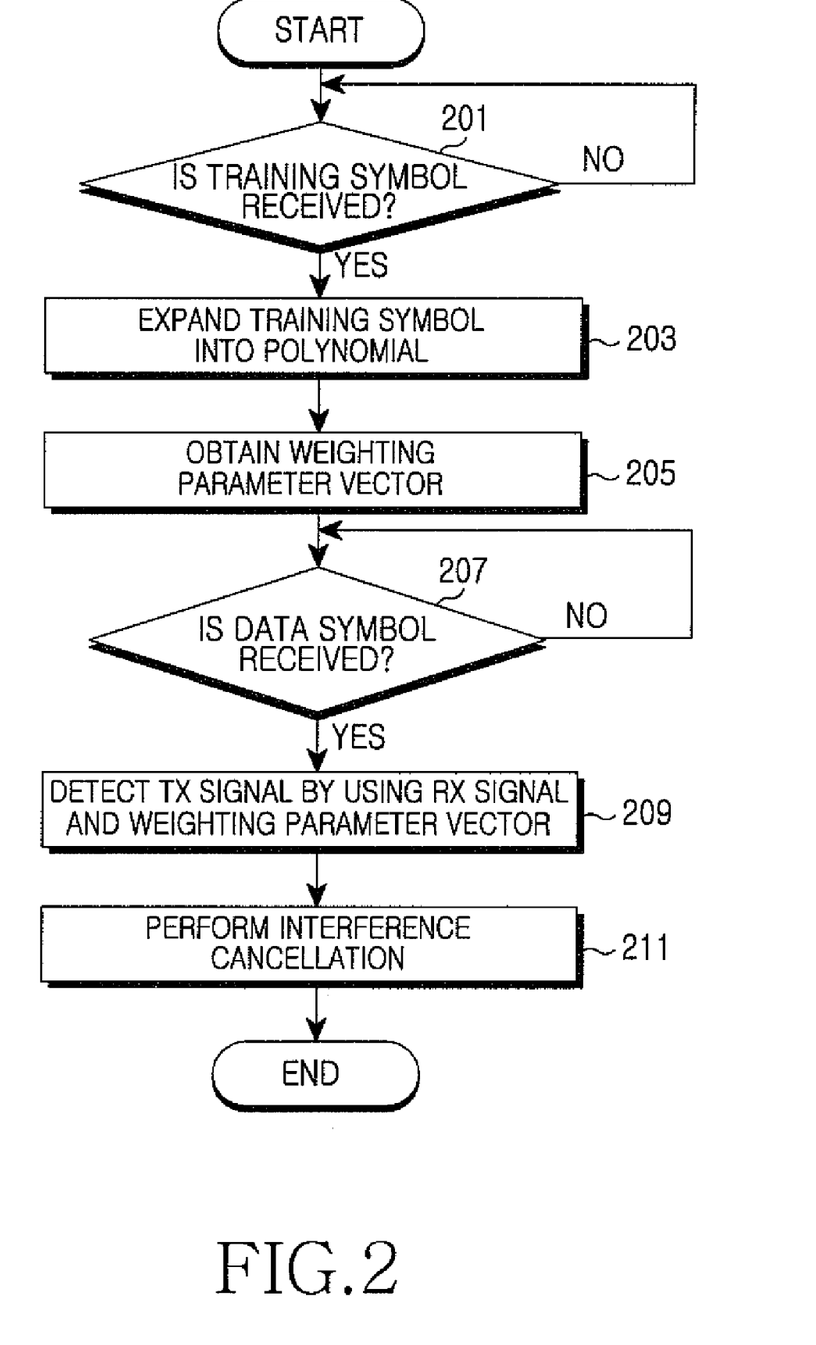
FIG. 2 is a flowchart illustrating a signal detection process of a receiving end in a MIMO wireless communication system according to an exemplary embodiment of the present invention.

FIG. 2 is a flowchart illustrating a signal detection process of a receiving end in a MIMO wireless communication system according to an exemplary embodiment of the present invention.

Referring to FIG. 2, the receiving end examines whether a plurality of training symbol vectors are received through a plurality of Rx antennas in step 201.

Upon receiving the training symbol vectors, the receiving end expands the training symbol vectors into polynomials in step 203. For example, if a training symbol vector $[t_1\ t_2]$ is received through two Rx antennas, the vector $[t_1\ t_2]$ is expanded into $[1, t_1, t_2, t_1^2, t_1 t_2, t_2^2]$.

In step 205, the receiving end arranges the expanded training symbol vectors in rows and thus configures an error coefficient matrix P. In addition, the receiving end generates a polynomial weighting parameter vector $\alpha$ using the matrix P and a Tx signal vector of training symbols. For example, the expanded training symbols are arranged as shown in Equation (5) above to obtain the matrix P, and the matrix P is substituted into Equation (4) or Equation (7) above to generate the vector $\alpha$. The step of generating the vector $\alpha$ may not be performed in every signal detection process. In this case, the step of generating the vector $\alpha$ may be performed according to a channel change level or according to a preset period.

In step 207, the receiving end examines whether a data signal vector is received.

Upon receiving the data signal vector, the receiving end detects Tx values of the data signal vector using the data signal vector and the vector $\alpha$ in step 209. That is, the receiving end expands the received data signal vector into a polynomial, respectively multiplies elements of the polynomial expanded from the data signal vector by corresponding elements of the vector $\alpha$, and sums the multiplication results. As a result, the Tx values of the data signal vector are detected. For example, the receiving end detects the Tx values of the data signal vector by performing an operation such as Equation (14) above.

In step 211, the receiving end cancels interference between the Tx values detected in step 209. In other words, the receiving end selects a detection value having the highest detection reliability from the detected Tx values, and then cancels a component of the selected detection value from an Rx signal corresponding to another detection value. In this case, the receiving end estimates a channel for each antenna between a transmitting end and the receiving end before the interference is cancelled.

According to the procedure of FIG. 2, the receiving end performs signal detection using a multivariate polynomial. In this case, the receiving end must determine a polynomial order. In other words, the receiving end must determine up to which order the Rx signal vector will be expanded. The higher the polynomial order, the better the detection performance. Thus, it is preferable to determine a high order when a channel condition is poor. The polynomial order may be determined by the transmitting end or the receiving end by considering the channel condition, an operational complexity and the like, or a fixed value may be used according to a system configuration.

If the polynomial order is determined by the transmitting end, the receiving end further performs a step of evaluating information regarding the polynomial that is forwarded from the transmitting end, and applies the result to step 203 and step 209. On the other hand, if the polynomial order is determined by the receiving end, the receiving end further performs a step of determining the order of a multivariate polynomial, and applies the result to step 203 and step 209. In addition, if the polynomial order is fixed, the receiving end expands the polynomial according to a value determined in step 203 and step 209.

Figure 3A:
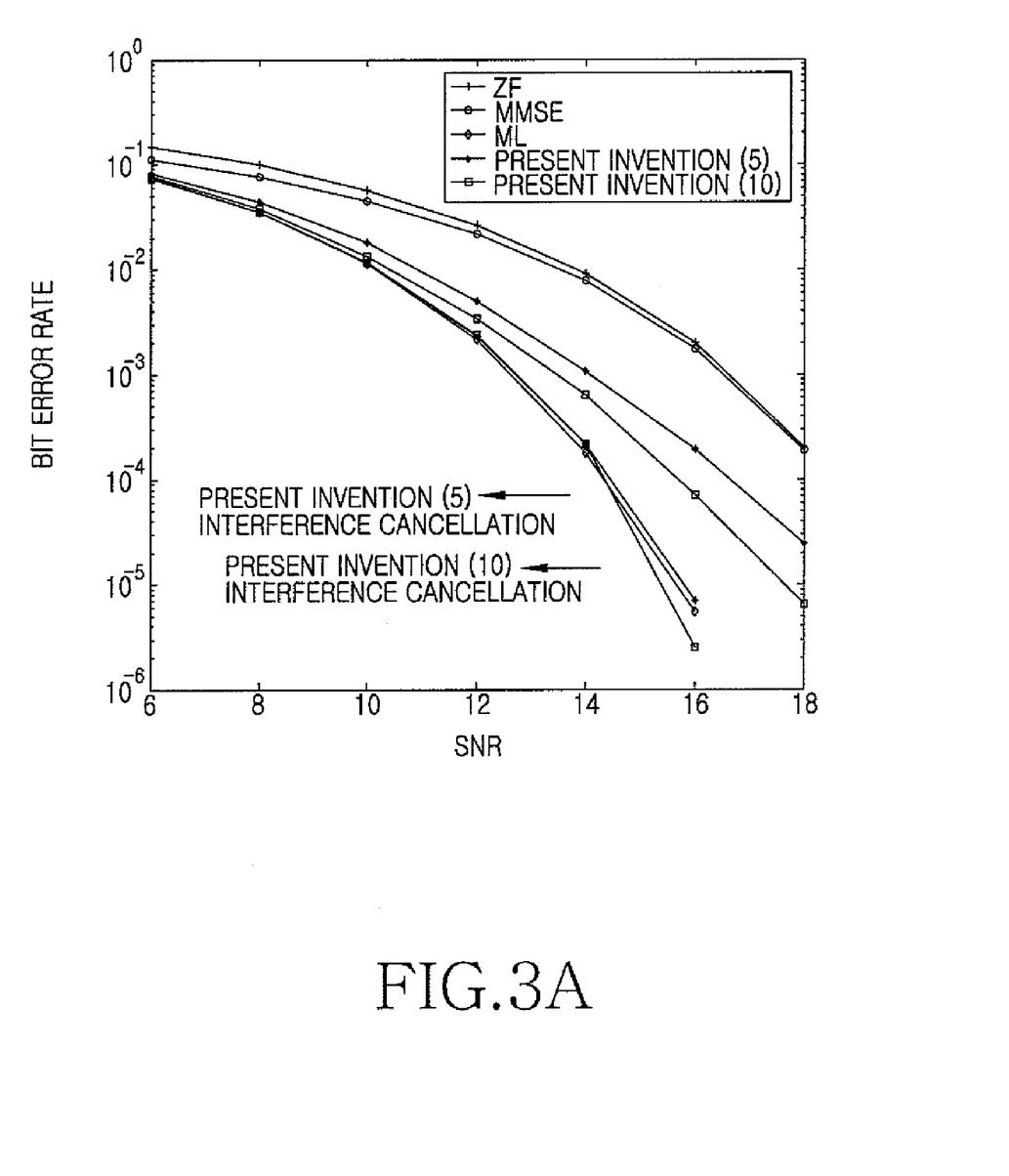
FIGS. 3A and 3B are graphs illustrating performance of a signal detection method according to an exemplary embodiment of the present invention.
Figure 3B:
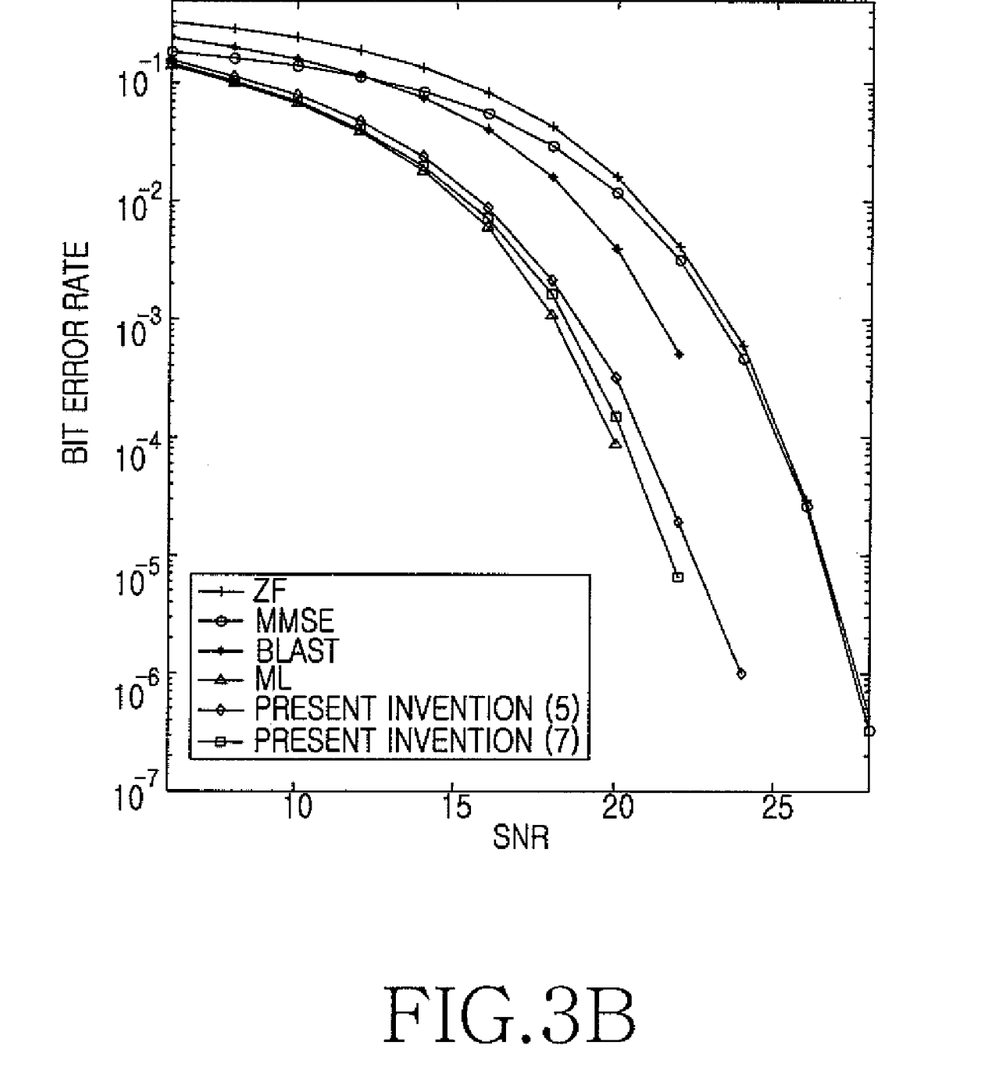

FIGS. 3A and 3B are graphs illustrating performance of a signal detection method according to exemplary embodiments of the present invention. The graphs of FIGS. 3A and 3B shows a simulation result of a receiving end that performs signal detection according to exemplary embodiments of the present invention. In the simulation, there are two Tx antennas and two Rx antennas, a channel is a Rayleigh fading channel, and a modulation scheme is Binary Phase Shift Keying (BPSK). In addition, in the graphs of FIGS. 3A and 3B, 'present invention (k)' represents a case where the present invention is used with a polynomial order k.

FIG. 3A illustrates a bit error ratio with respect to a Signal to Noise Ratio (SNR) according to an exemplary detection method of the present invention in comparison with the conventional detection methods under the condition where correlation does not exist between Rx antennas. The conventional detection methods compared in FIG. 3A are Zero Forcing (ZF) detection, Minimum Mean Square Error (MMSE) detection, and Maximum Likelihood (ML) detection. As shown in FIG. 3A, an exemplary detection method of the present invention outperforms the ZF detection and the MMSE detection. Further, when interference cancellation is additionally performed, the detection method of the present invention shows a performance close to that of the ML detection.

FIG. 3B illustrates a bit error rate with respect to an SNR according to an exemplary detection method of the present invention in comparison with the conventional detection methods under the condition where correlation exists between Rx antennas. The conventional detection methods compared in FIG. 3B are ZF detection, MMSE detection, Bell Laboratory Layered Space-Time (BLAST) detection, and ML detection. As shown in FIG. 3B, an exemplary detection method of the present invention significantly outperforms the ZF detection, the MMSE detection, and the BLAST detection. Further, the exemplary detection method shows a performance similar to that of the ML detection in a case where the polynomial order is 5 and a case where the polynomial order is 7.

According to exemplary embodiments of the present invention, signal detection is performed using a simplified multivariate polynomial in a MIMO wireless communication system. Therefore, it is possible to obtain performance close to that of a non-linear scheme and an operation complexity less than that of the non-linear scheme.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A receiving-end apparatus in a Multiple Input Multiple Output (MIMO) wireless communication system, the apparatus comprising:
   a plurality of receivers for receiving training symbol vectors and a data signal vector from a transmitting end through a plurality of corresponding receive (Rx) antennas; and
   a detector for expanding the training symbol vectors into second- or higher-order polynomials, for generating a weighting parameter vector for multivariate polynomial expansion of the data signal vector by using the polynomials expanded from the training symbol vectors and for expanding the data signal vector into a second- or higher-order multivariate polynomial using the weighting parameter vector, and for detecting Transmit (Tx) values of the data signal vector from the multivariate polynomial,
   wherein the polynomials comprise a plurality of elements more than a number of elements of an original vector and comprise at least one of an element of the original vector, a square of an element of the original vector, and a multiplication of two elements of the original vector, and wherein the original vector comprises one of the training symbol vector and the data signal vector.

2. The apparatus of claim 1, wherein the detector configures a matrix whose rows are polynomials expanded respectively from the training symbol vectors, and generates the weighting parameter vector using the matrix and the Tx values of the training symbol vectors.

3. The apparatus of claim 2, wherein the detector generates the weighting parameter vector as expressed by:

$$\alpha = \frac{P^T}{P^T P} y,$$

where $\alpha$ denotes the weighting parameter vector, P denotes the matrix consisting of polynomials expanded from the training symbol vectors, and y denotes the Tx values of the training symbol vectors.

4. The apparatus of claim 2, wherein the detector generates the weighting parameter vector as expressed by:

$$\alpha = \frac{P^T}{P^T P + bI} y,$$

where $\alpha$ denotes the weighting parameter vector, P denotes the matrix consisting of polynomials expanded from the training symbol vectors, y denotes the Tx values of the training symbol vectors, and b denotes a regularization constant.

5. The apparatus of claim 1, wherein the detector expands the data signal vector into a polynomial and detects the Tx values of the data signal vector by multiplying elements of the polynomial expanded from the data signal vector by a corresponding element of the weighting parameter vector and by summing the multiplication results.

6. The apparatus of claim 5, wherein the detector detects the Tx values of the data signal vector as expressed by:

$$\alpha_0 + \sum_{k=1}^{r} \sum_{j=1}^{l} \alpha_{kj} x_j^k + \sum_{j=1}^{r} \alpha_{rl+j}(x_1 + x_2 + \ldots + x_l)^j + \sum_{j=2}^{r} (\alpha_j^T \cdot x)(x_1 + x_2 + \ldots + x_l)^{j-1}, l, r \geq 2,$$

where $\alpha_j$ denotes a $j^{th}$ element of the weighting parameter vector, $x_j$ denotes a $j^{th}$ element of the data signal vector, l denotes the number of input values, and r denotes an approximation order.

7. The apparatus of claim 6, wherein the detector detects the Tx values of the data signal vector using a reduced model obtained from a multivariate polynomial expressed by:

$$\hat{f}_{MN} = \alpha_0 + \sum_{j=1}^{r} (\alpha_{j1} x_1 + \alpha_{j2} x_2 + \ldots + \alpha_{jl} x_l)^j,$$

where $\hat{f}_{MN}$ denotes a multinomial when the weighting parameter vector is $\alpha$, $\alpha_j$ denotes a $j^{th}$ element of the weighting parameter vector, and $x_l$ denotes an $l^{th}$ element of the data signal vector.

8. The apparatus of claim 1, further comprising a canceller for canceling mutual interference between the Tx values of the detected data signal vector by selecting one of the Tx values of the detected data signal vector and by removing a component of the selected value from an Rx signal corresponding to an unselected value.

9. The apparatus of claim 1, further comprising:
an evaluator for evaluating polynomial order information feed-forwarded from the transmitting end,
wherein the detector expands the polynomial according to the polynomial order evaluated by the evaluator.

10. The apparatus of claim 1, further comprising:
a determining unit for determining an order of the multivariate polynomial,
wherein the detector expands the polynomial according to the polynomial order determined by the determining unit.

11. The apparatus of claim 1, wherein the detector expands the multivariate polynomial according to a preset polynomial order.

12. A signal detection method of a receiving end in a Multiple Input Multiple Output (MIMO) wireless communication system, the method comprising:
receiving training symbol vectors and a data signal vector from a transmitting end through a plurality of corresponding receive (Rx) antennas;
expanding the training symbol vectors into second- or higher-order polynomials;
generating a weighting parameter vector for multivariate polynomial expansion of the data signal vector using the polynomials expanded from the training symbol vectors;
expanding the data signal vector received from the transmitting end into a second- or higher-order multivariate polynomial using the weighting parameter vector; and
detecting Transmit (Tx) values of the data signal vector from the multivariate polynomial,
wherein the polynomials comprise a plurality of elements more than a number of elements of an original vector and comprise at least one of an element of the original vector, a square of an element of the original vector and a multiplication of two elements of the original vector, and
wherein the original vector comprises one of the training symbol vector and the data signal vector.

13. The method of claim 12, wherein the generating of the weighting parameter vector comprises:
configuring a matrix whose rows are polynomials expanded respectively from the training symbol vectors; and
generating the weighting parameter vector using the matrix and the Tx values of the training symbol vectors.

14. The method of claim 13, wherein the weighting parameter vector is generated as expressed by:

$$\alpha = \frac{P^T}{P^T P} y,$$

where α denotes the weighting parameter vector, P denotes the matrix consisting of polynomials expanded from the training symbol vectors, and y denotes the Tx values of the training symbol vectors.

15. The method of claim 13, wherein the weighting parameter vector is generated as expressed by:

$$\alpha = \frac{P^T}{P^T P + bI} y,$$

where α denotes the weighting parameter vector, P denotes the matrix consisting of polynomials expanded from the training symbol vectors, y denotes the Tx values of the training symbol vectors, and b denotes a regularization constant.

16. The method of claim 12, wherein the expanding of the data signal vector received from the transmitting end into a second- or higher-order multivariate polynomial comprises:
expanding the data signal vector into a polynomial; and
multiplying elements of the polynomial expanded from the data signal vector by a corresponding element of the weighting parameter vector.

17. The method of claim 16, wherein the detecting of the Tx values of the data signal vector comprises summing all elements of the multivariate polynomial.

18. The method of claim 17, wherein the Tx values of the data signal vector are detected by:

$$\alpha_0 + \sum_{k=1}^{r}\sum_{j=1}^{l} \alpha_{kj} x_j^k + \sum_{j=1}^{r} \alpha_{rl+j}(x_1 + x_2 + \ldots + x_l)^j +$$

$$\sum_{j=2}^{r}(\alpha_j^T \cdot x)(x_1 + x_2 + \ldots + x_l)^{j-1}, l, r \geq 2,$$

wherein $\alpha_j$ denotes a $j^{th}$ element of the weighting parameter vector, $x_j$ denotes a $j^{th}$ element of the data signal vector, l denotes the number of input values, and r denotes an approximation order.

19. The method of claim 18, wherein the Tx values of the data signal vector are detected using a reduced model obtained from a multivariate polynomial expressed by:

$$\hat{f}_{MN} = \alpha_0 + \sum_{j=1}^{r}(\alpha_{j1} x_1 + \alpha_{j2} x_2 + \ldots + \alpha_{jl} x_l)^j,$$

where $\hat{f}_{MN}$ denotes the multivariate polynomial when the weighting parameter vector is α, $\alpha_j$ denotes a $j^{th}$ element of the weighting parameter vector, and $x_l$ denotes an $l^{th}$ element of the data signal vector.

20. The method of claim 12, further comprising:
canceling a mutual interference between the Tx values of the detected data signal vector by selecting one of the Tx values of the detected data signal vector and by removing a component of the selected value from an Rx signal corresponding to an unselected value.

21. The method of claim 12, further comprising:
evaluating polynomial order information feed-forwarded from the transmitting end; and
expanding the polynomial according to the polynomial order evaluated.

22. The method of claim 12, further comprising:
determining an order of the multivariate polynomial; and
expanding the polynomial according to the determined polynomial order.

23. The method of claim 12, wherein the multivariate polynomial is expanded according to a preset polynomial order.

* * * * *